(12) United States Patent
Jamison

(10) Patent No.: US 8,902,523 B2
(45) Date of Patent: Dec. 2, 2014

(54) SYSTEMS AND METHODS FOR UTILIZING IMPERFECTLY MANUFACTURED IMAGE INTENSIFIER TUBES IN NIGHT VISION SYSTEMS

(76) Inventor: Kenneth Jamison, Boerne, TX (US)

( * ) Notice: Subject to any disclaimer, the term of this patent is extended or adjusted under 35 U.S.C. 154(b) by 0 days.

(21) Appl. No.: 13/458,881

(22) Filed: Apr. 27, 2012

(65) Prior Publication Data
US 2013/0114158 A1 May 9, 2013

Related U.S. Application Data

(60) Provisional application No. 61/479,834, filed on Apr. 27, 2011.

(51) Int. Cl.
*G02B 5/00* (2006.01)
*G03F 5/00* (2006.01)
*G03B 27/58* (2006.01)
*G02B 27/00* (2006.01)
*G02B 23/12* (2006.01)
*H01J 31/50* (2006.01)

(52) U.S. Cl.
CPC *G02B 5/00* (2013.01); *G02B 5/005* (2013.01); *G02B 27/0012* (2013.01); *G02B 23/12* (2013.01); *H01J 31/50* (2013.01)
USPC ............. 359/894; 359/893; 359/895; 355/74

(58) Field of Classification Search
USPC ............. 359/893–895; 353/75; 700/117, 116; 355/74
See application file for complete search history.

(56) References Cited

U.S. PATENT DOCUMENTS

| | | | |
|---|---|---|---|
| 3,936,137 A | 2/1976 | Litman | |
| 5,371,355 A | 12/1994 | Wodecki | |
| 5,408,088 A | 4/1995 | Chapman et al. | |
| 5,711,889 A | 1/1998 | Buchsbaum | |
| 6,466,306 B1 * | 10/2002 | Davis | 356/4.03 |
| 6,747,258 B2 | 6/2004 | Benz et al. | |
| 7,282,690 B2 | 10/2007 | Smith et al. | |
| 7,696,462 B2 | 4/2010 | Saldana | |
| 2011/0085791 A1 * | 4/2011 | Laganas et al. | 396/530 |

* cited by examiner

Primary Examiner — Scott J Sugarman
Assistant Examiner — Mustak Choudhury
(74) Attorney, Agent, or Firm — Kammer Browning PLLC

(57) ABSTRACT

Systems and methods are provided for modifying blemished image intensifier tubes that otherwise would be inappropriate for use in strictly specified night vision equipment. The systems include masks and display elements designed and structured to be oriented in a variety of directions so as to cover over and hide blemishes within an image intensifier tube. Masks may be provided utilizing glass discs that are ground, polished, and etched with particular geometric masking elements and fixed over the display end of the image intensifier tube. Electronic components may be presented as display elements over the opaque portions of the masks. Methods for manufacturing the masks are described that detect and characterize the location and size of the blemishes and select mask type, size, and orientation for manufacture and use.

15 Claims, 9 Drawing Sheets

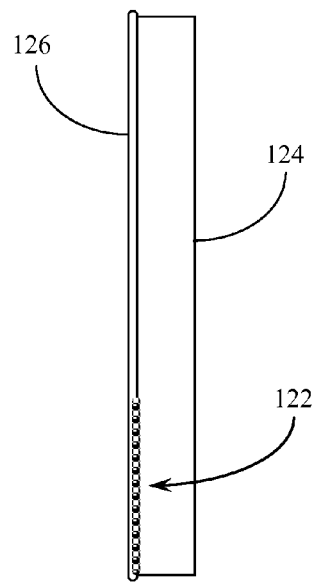
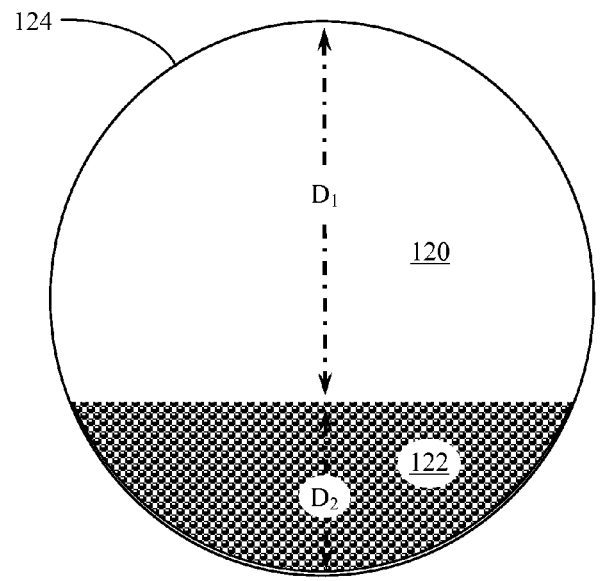
Fig. 10A    Fig. 10B
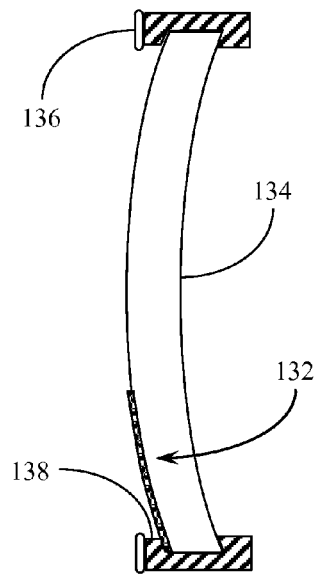
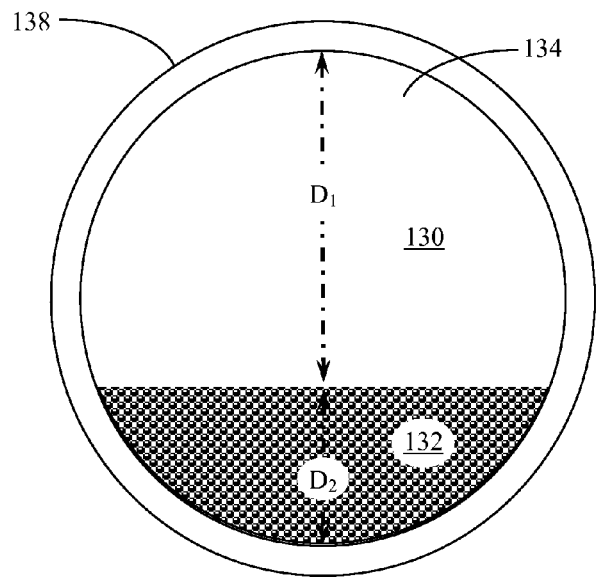
Fig. 11A    Fig. 11B

US 8,902,523 B2

SYSTEMS AND METHODS FOR UTILIZING IMPERFECTLY MANUFACTURED IMAGE INTENSIFIER TUBES IN NIGHT VISION SYSTEMS

CROSS REFERENCES TO RELATED APPLICATIONS

This application claims the benefit under Title 35 United States Code §119(e) of U.S. Provisional Application 61/479,834 filed Apr. 27, 2011 the full disclosure of which is incorporated herein by reference.

BACKGROUND OF THE INVENTION

1. Field of the Invention

The present invention relates generally to image intensifier tubes used in night vision equipment and systems. The present invention relates more specifically to methods and systems for utilizing certain imperfect or blemished image intensifiers with night vision equipment using screen masks and ancillary screen elements.

2. Description of the Related Art

The core component in a night vision device is the image intensifier tube. These optoelectronic devices are manufactured to strict standards that frequently result in a high and expensive rejection rate of manufactured tubes that do not meet the standards for military (as an example) night vision equipment. It is not unusual to have blemishes in the nature of emission points or e-points in the resultant screen associated with the image intensifier tube that can jeopardize the "clean" quality of the image.

An image intensifier tube typically displays an image through the use of a fiber optic bundle. The output screen of the fiber optic bundle is ground and polished either flat or concave to accommodate or match the image gathering characteristics of the night vision system eyepiece that is used to view the image. Because of hard to control process variables in the manufacture of image intensifiers, they often have blemishes and emission points that make them un-useable, or at best difficult to sell. This is understandable because in general, a purchaser does not like to see imperfections in the field of view and generally considers such imperfections as a sign of a less than perfect tube. This is especially true given the high cost of night vision systems in general. Typically, blemished image intensifiers are a tough sell and usually a manufacturer must dramatically discount a night vision system that incorporates or utilizes one of these so-called "blem-tubes".

Most night vision equipment has specifications that require the absence of blemishes of a certain size within one or more zones within the typically circular image field. Reference is made to FIG. 9 for an understanding of the manner of grading an image intensifier tube with one or more blemishes. For example, Zone One 112, the center of the circular screen field 110, would typically require the absence of any blemishes of significant size, mainly because it provides the focal point for the view that the user is directed towards. A concentric Zone Two 114 surrounding Zone One may have a requirement of no more than one or two blemishes larger than 2 µm in diameter. A further concentric Zone Three 116 forming the edge of the circular image field 110 may have less stringent requirements such as no more than two or three blemishes larger than 5 µm or less. The above numbers are given as examples only and do not constitute the specific requirements for any particular night vision device. These example requirements do, however, convey the importance associated with the quantity and quality of the blemishes and their position within the field of view formed by the image intensifier.

As a result of the above requirements, many manufactured image intensifier tubes are discarded as defective and inappropriate for use in standard night vision goggle equipment. Typically these defective units can not be repaired and are simply disposed of even though they may present a field of view that is relatively free of blemishes and might operate satisfactorily for many or most purposes. It would therefore be desirable to have devices and methods for utilizing these so-called "defective" image intensified tubes so as to reduce the waste associated with a quite costly manufacturing process.

SUMMARY OF THE INVENTION

The present invention therefore provides devices and methods for utilizing newly manufactured image intensifier tubes that retain blemishes that make them inappropriate for use in strictly specified night vision equipment. The devices provided in the present invention include masks and display elements designed and structured to be oriented in a variety of directions so as to cover over and hide the particular blemishes that an individual image intensifier tube might carry. The present invention provides for a variety of mask elements including a variety of geometrically configured masking discs inserted over the rear (the display end) of the image intensifier tube that may be oriented (rotated) to specifically cover a particular array of one or more blemishes. Similar masks may be provided utilizing glass discs that are ground, polished, etched, and/or printed with particular geometric masking elements and fixed over the display end of the image intensifier tube. In addition to the mask elements, the present invention provides electronic components that may be presented as display elements (simple indicators or complex numerical displays) on the opaque portions of the masking discs positioned over the output screen of the image intensifier tube. In other words, although it is known to provide display elements in standard night vision equipment, the present invention makes use of the geometrically structured obscuring mask elements to provide indicator or digital information to the viewer associated with use of the night vision equipment. Such additional information may preferably include range information derived from an infrared laser beam directed out from the night vision equipment and reflected back by elements within the view of the optics of the night vision equipment. Range finder electronics may translate the distance information into a digital display that is positioned in association with the screen mask utilized to cover over the blemishes in the particular image intensifier tube. Simple indicators may also be used within the masked areas such as to show a low battery condition or to warn of an infrared illuminator being activated.

BRIEF DESCRIPTION OF THE DRAWINGS

FIGS. 10A & 10B provide a detailed side elevational view and a detailed front elevational view of an alternate preferred embodiment of the present invention utilizing a partially coated flat glass disc for the mask element.

FIGS. 11A & 11B provide a detailed side elevational view and a detailed front elevational view of an alternate preferred embodiment of the present invention utilizing a partially coated concave glass disc for the mask element.

DETAILED DESCRIPTION OF THE PREFERRED EMBODIMENTS

Figure 1:
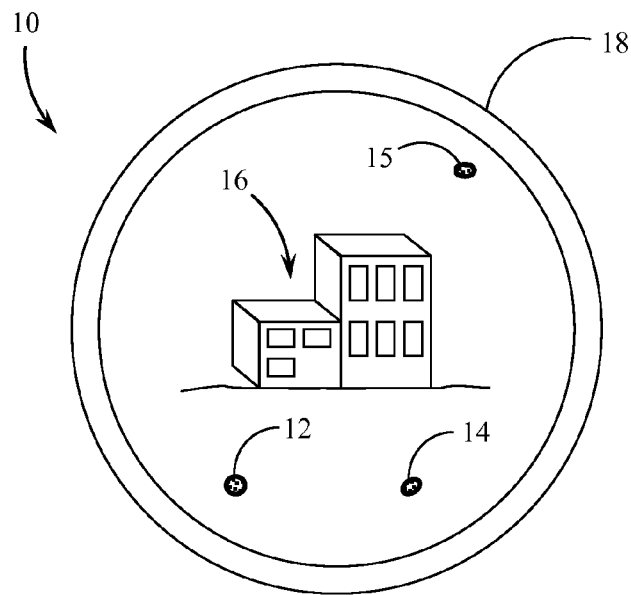
FIG. 1 is a front elevational view of a typical field image provided by a light intensifier tube utilized in night vision equipment shown with a number of blemishes within the field of view such as might otherwise disrupt the functionality of the equipment.

FIG. 1 represents a typical prior art example of a "defective" image intensifier tube showing a plurality of blemishes resulting from the manufacturing process. Image intensifier tube 10 positioned within cylindrical case 18 is shown to include blemishes 12, 14, and 15 positioned at random points within the viewing area presented to the user. In this instance, even though a distant object 16 may be centered within the field of view, and as such not directly obstructed by blemishes 12, 14, or 15, the peripheral view of the emission points could be mistaken for actual objects in the field and result in a distracted user with potentially dangerous results.

Figure 2:
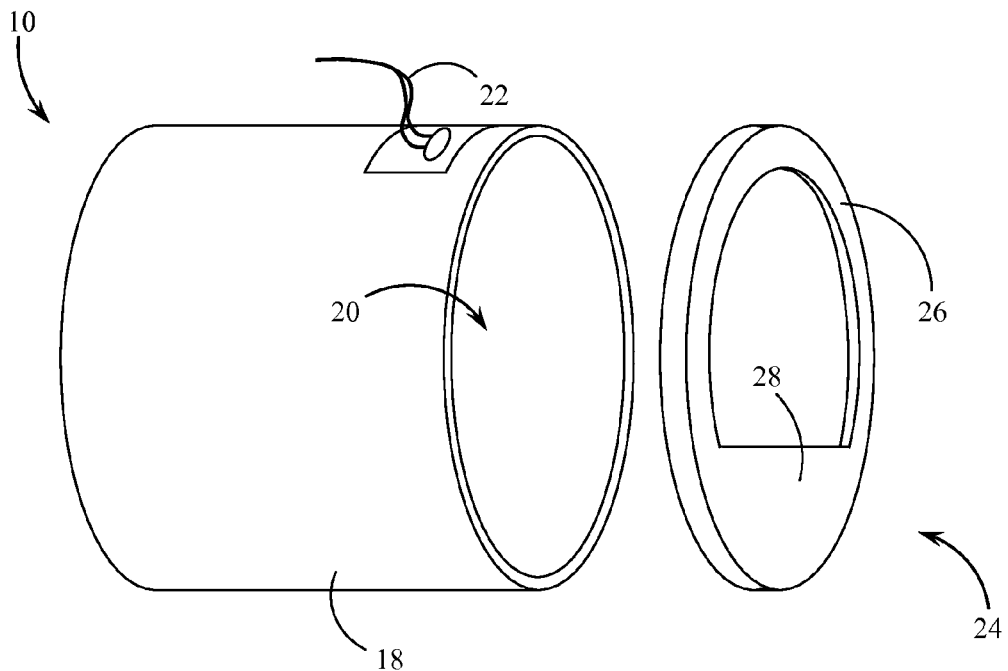
FIG. 2 is a perspective view of the system of the present invention showing a typical image intensifier tube and the placement of a mask element of the present invention in association therewith.

Reference is next made to FIG. 2 which is a perspective view of a typical image intensifier tube 10 manufactured within cylindrical enclosure 18 presenting an output image screen 20. The optoelectronic device that is the image intensifier tube 10 includes electrical connection 22 directed to the power and electronic elements associated with the night vision device. The present invention provides mask disc 24 which includes a circumferential ring portion 26 as well as an obscuring geometric portion 28.

Figure 3:
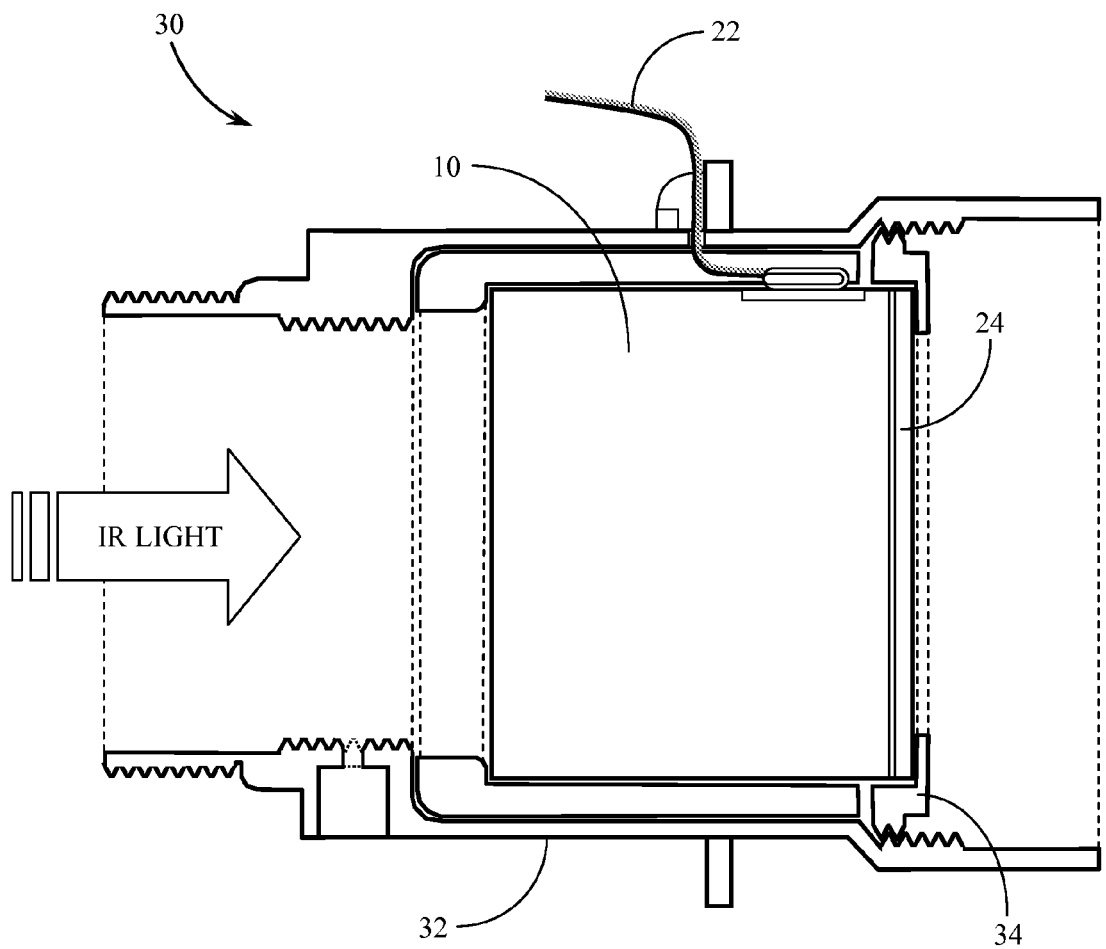
FIG. 3 is a cross-sectional view of a typical night vision system utilizing an image intensifier tube for receiving infrared light and forming a visible light image on the output face of the image intensifier tube, in this case incorporating the mask element (partially obscuring disc) of the present invention over the output screen.

FIG. 3 is a cross-sectional view that shows the typical manner in which the partially obscuring mask disc 24 is positioned within a night vision device on the output (viewing) end of the image intensifier tube 10. In FIG. 3, image intensifier tube 10 is positioned within night vision device 30 within housing enclosure 32. The electronic/electrical connection 22 is shown to extend from image intensifier tube 10 outward into the balance of the electronics associated with the device. Partially obscuring mask disc 24 is shown positioned over the output end of the image intensifier tube 10, held in place with set ring 34 as may normally be utilized in conjunction with the placement and positioning of the image intensifier tube and any output optics associated with the tube.

Figure 4A:
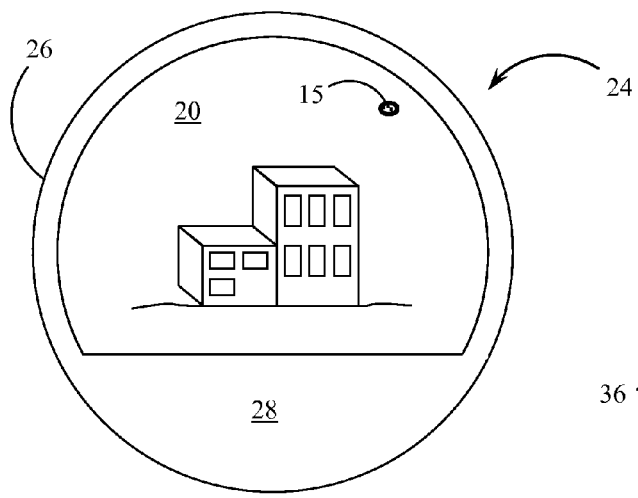
FIGS. 4A-4C are various geometric embodiments of the partially obscuring disc mask of the present invention utilized to cover over blemishes in a typical "defective" image intensifier tube.
Figure 4B:
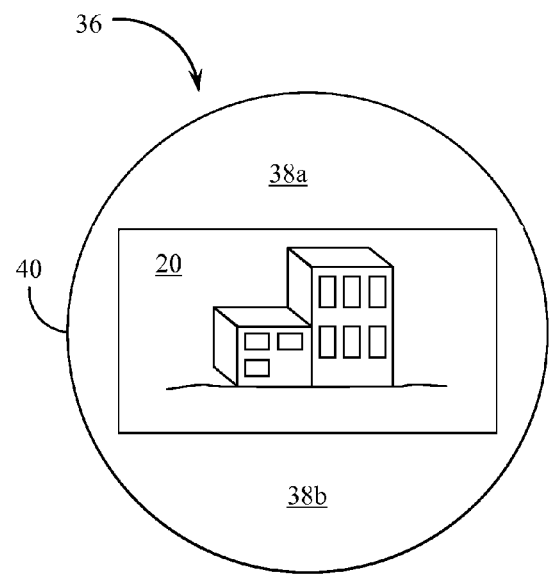
Figure 4C:
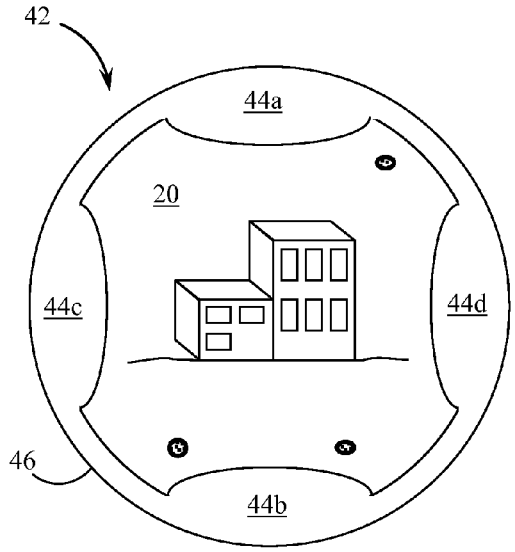

FIGS. 4A-4C represent three examples of the geometries that might be utilized in the partially obscuring mask components of the present invention. FIG. 4A represents the mask device 24 shown in FIG. 2 wherein two of the three blemishes (see FIG. 1) have been obscured from view by the obscuring geometric portion 28 established by an area defined by a geometric cord of the circle extending across the disc. As is apparent from the manner of placement of the partially obscuring disc 24 in FIG. 3, the orientation of the disc may be varied such that the obscuring portion 28 is rotated to variably address the greatest number or the largest blemishes within the field of view 20 associated with a particular "defective" or "below spec" image intensifier tube.

FIG. 4B represents a further example of a partially obscuring mask disc 36 that in this case presents two larger obscuring portions 38a and 38b that together narrow the field of view 20 into what might be characterized as a "wide screen view" that fully eliminates the view of the blemishes shown in the example of FIG. 1.

FIG. 4C provides yet another example of the manner in which selective geometric shapes may be incorporated into the circular disc so as to obscure various portions of the field of view 20 and thereby allow a variable selection for covering over blemishes in the image intensifier tube. Geometric obscuring portions 44a-44d are symmetrically positioned around obscuring disc mask 42 to obscure some portions of the field of view 20. FIG. 4C may represent the orientation of mask 42 during manufacture and before final fixing of the mask with respect to the intensifier tube. It will be recognized that rotation (in either direction) of the partially obscuring disc mask 42 may achieve coverage over at least two, if not all three, of the blemishes present in the example shown.

Figure 5:
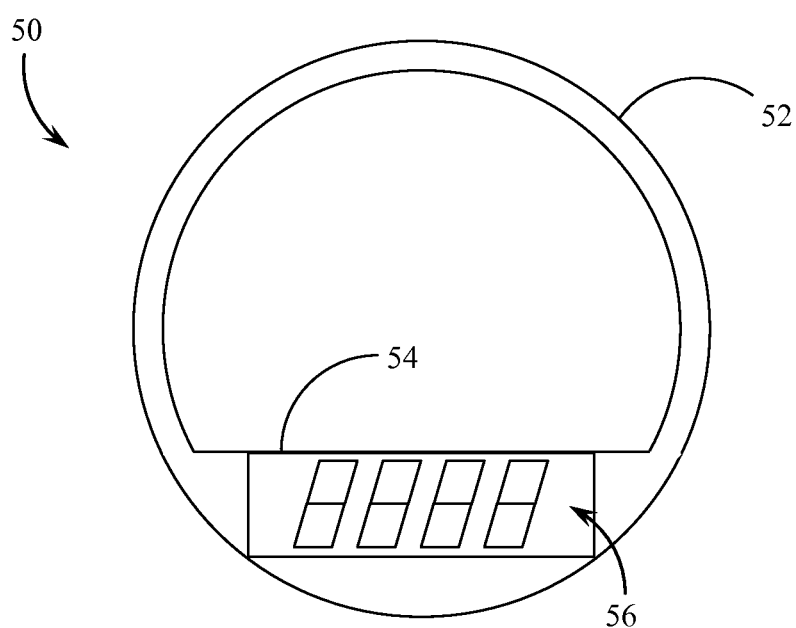
FIG. 5 is a front elevational view of a partially obscuring disc mask element of the present invention incorporating a digital display for presenting quantitative information regarding elements within the field of view with the night vision equipment.
Figure 6:
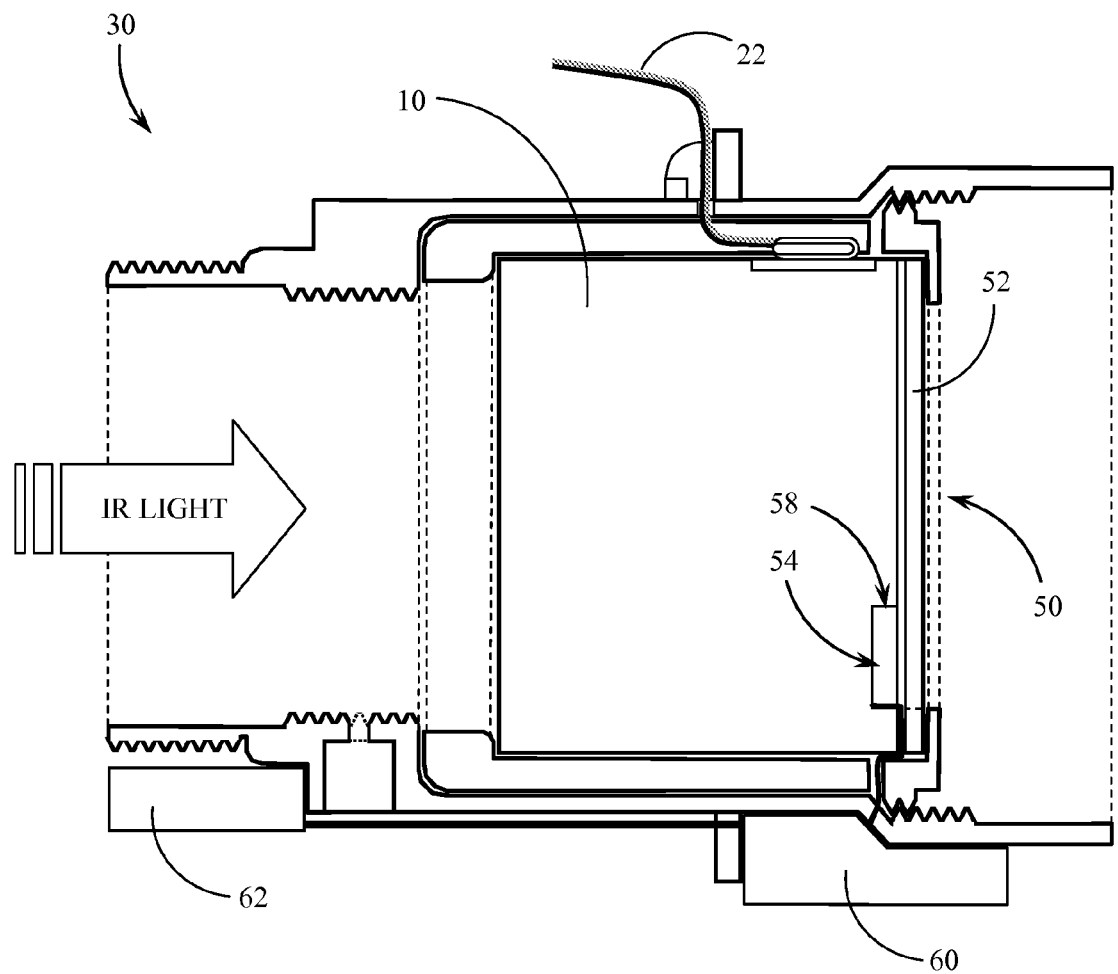
FIG. 6 is a cross-sectional view of a typical night vision device incorporating an image intensifier tube and further incorporating the digital display component identified generally in FIG. 5, in this case associated with a range finder sensor and associated electronics.

Reference is next made to FIGS. 5 and 6 which present the additional feature of incorporating a digital display element into that portion of the partially obscuring mask disc to serve the purpose of providing quantitative information to the user as is sometimes accomplished with various night vision devices. Instead of obscuring a "clean" portion of the image intensifier tube, the present invention is capable of positioning a digital display module 54 having numeric (or alphanumeric) digits 56 in association with the portion of the partially obscuring mask disc 50 that covers over the blemishes in the "defective" image intensifier tube. Mask disc element 50 shown as an example in FIG. 5 incorporates a four digit digital display (preferably LED) that may provide any of a variety of different types of information to the user. FIG. 6 shows the manner in which the electronics associated with the digital display module 54 may be positioned in place with respect to the image intensifier tube 10 and the partially obscuring mask 52. IR laser 62 projects the infrared light beam out from the forward facing portion of the night vision device, which beam is then reflected back and its transit time measured to provide range finder information through range finder electronics 60 to be displayed on the digital display module 54.

It may be preferable to incorporate a digital display such as that shown in FIGS. 5 & 6 in a recessed manner into the screen surface of the image intensifier tube in order to provide the same focal plane for both the image produced by the image intensifier tube and the digital display. Such is the configuration shown in FIG. 6 whereby the digital display is recessed 58 into the image intensifier tube 10 and the partially obscuring disc 52 retains a geometric aperture appropriate for viewing the digital display.

Figure 7A:
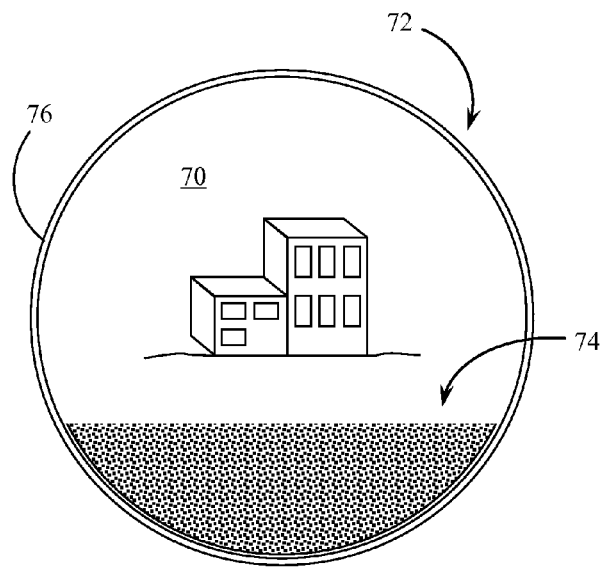
FIGS. 7A-7C are various geometric embodiments of the partially obscuring layered glass disc mask embodiment of the present invention utilized to cover over blemishes in a typical "defective" image intensifier tube.
Figure 7B:
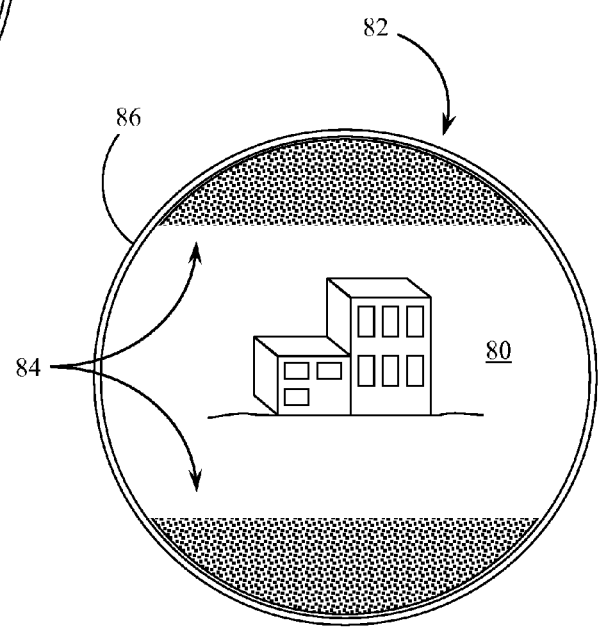
Figure 7C:
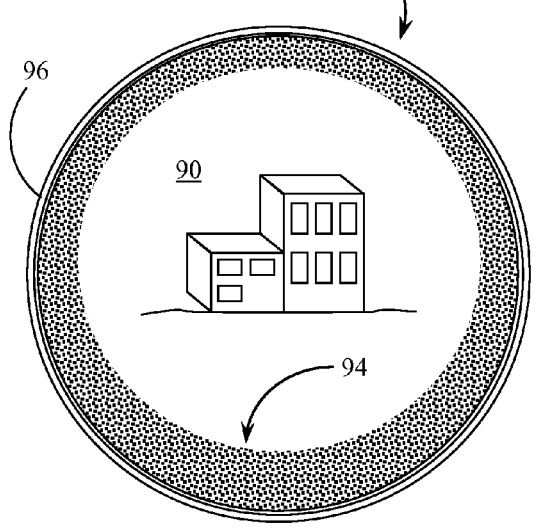

Reference is made to FIGS. 7A-7C for detailed descriptions of various geometric shapes for the partially obscuring layered glass disc mask embodiment of the present invention utilized to cover over blemishes in a typical "defective" image intensifier tube. As opposed to a cutout opaque mask disc, this alternate embodiment utilizes optical glass discs that are partially coated to provide the opaque portion of the field of view. Three basic mask configurations are described: a "floor" mask (FIG. 7A); a "letterbox" mask (FIG. 7B); and an "annular" mask (FIG. 7C). The "floor" mask 72 in FIG. 7A provides an opaque screen 74 over a circular segment of the glass disc mask 76 defined by a chord across the circular field of view 70, generally parallel to what would be the horizon in the field of view 70. The "letterbox" mask 82 in FIG. 7B provides a pair of opaque screens 84 over circular segments of the glass disc mask 86 defined by two chords (that may or may not be of equal length) across the circular field of view 80, again generally parallel to what would be the horizon in the field of view 80. The "annular" mask 92 in FIG. 7C provides a circular or elliptical opaque screen 94 over the outer edge segment of the glass disc mask 96 defined by either a circular radius or elliptical radii (that may or may not be concentric with the glass disc) around the circular field of view 90, preferably having left to right symmetry so as to avoid an optical distraction in the field of view 90.

Figure 8:
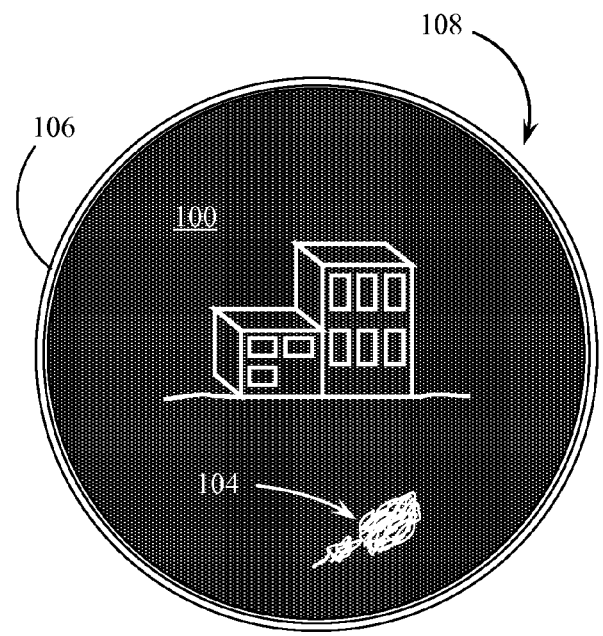
FIG. 8 is a front elevational view of a typical field image provided by a light intensifier tube utilized in night vision equipment shown in its actual image format (bright on dark) that better represents the manner in which a blemish will distract the user from the clear field of view.

FIG. 8 is a front elevational view of a typical field image 100 having perimeter 106, provided by a light intensifier tube 108 utilized in night vision equipment. In this view the field is shown in its actual image format (bright on dark) in a manner that better represents how a blemish 104 will distract the user from the clear field of view. The balance of the field of view representations in the present application are shown in negative format (dark on bright) for greater clarity regarding the masking effect.

Figure 9:
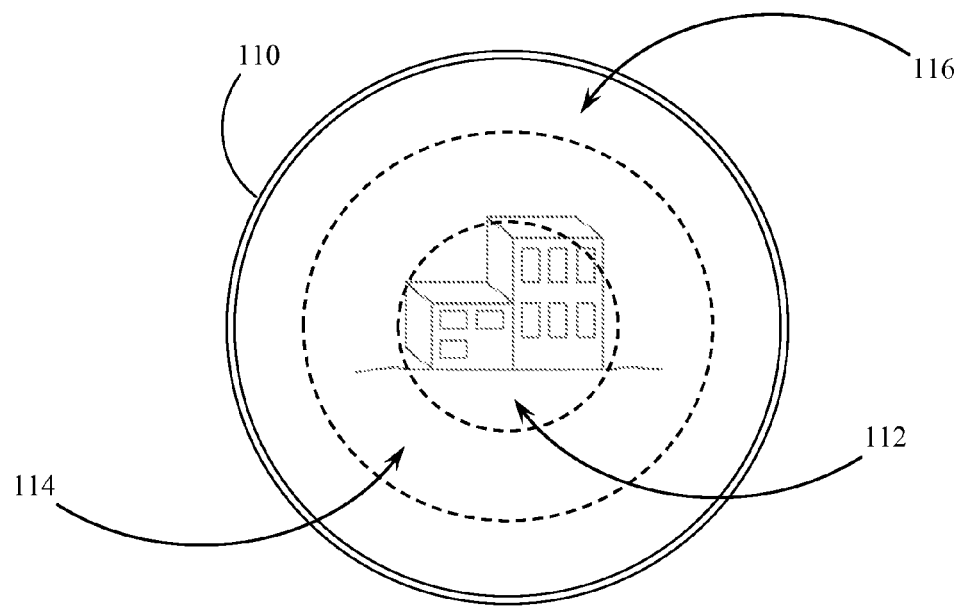
FIG. 9 is a front elevational view of a typical field image (shown in reversed dark on bright for clarity here) provided by a light intensifier tube utilized in night vision equipment showing the various zones of concern that allow grading of a manufactured device.

FIG. 9 is a front elevational view of a typical field image (shown in reversed dark on bright for clarity here) provided by a light intensifier tube utilized in night vision equipment showing the various zones of concern that allow grading of a manufactured device. Zone One 112, the center of the circular screen field 110, would typically require the absence of any blemishes of significant size as it provides the focal point for the view. Concentric Zone Two 114 surrounding Zone One 112 may require no more than one or two blemishes larger than 2 μm in diameter. A further concentric Zone Three 116 forming the edge of the circular image field 110 may have less stringent requirements such as no more than two or three blemishes larger than 5 μm or less. The above numbers are given as examples only and do not constitute the specific requirements for any particular night vision device. These example requirements do, however, convey the importance associated with the quantity and quality of the blemishes and their position within the field of view formed by the image intensifier.

FIGS. 10A & 10B provide a detailed side elevational view and a detailed front elevational view of an alternate preferred embodiment of the present invention utilizing a partially coated flat glass disc for the mask element. The manner of creating the opaque layer on the surface of the glass disk may be by any of a number of methods for depositing or etching surfaces onto glass. One example of such a method may be found in the disclosure of U.S. Pat. No.: 5,711,889, the full disclosure of which is incorporated herein by reference. Other methods of depositing of opaque material on glass surfaces are anticipated.

In the preferred embodiment of the present invention a glass wafer 124 is ground and polished to match the output screen geometry of the image intensifier. The glass is then masked using microlithography to create an opaque area 122 on the surface of the disc. The glass disc is then aligned to the image intensifier and glued to the optical screen using UV optical glue 126. Orientation of the mask (based in part on the form of the mask) is made so as to hide the one or more blemishes on the image intensifier tube from view. The glass mask may be flat or concave (see FIGS. 11A & 11B) of any diameter to fit any type of typical image intensifier output bundle configuration. Tubes that can apply this technology include but are not limited to (using military nomenclature) MX-9916, 18281, 18282, 10130, 10160, 9644, 11620, and 11769.

FIGS. 11A & 11B provide a detailed side elevational view and a detailed front elevational view of an alternate preferred embodiment of the present invention utilizing a partially coated concave glass disc 134 for the mask element. The concave glass is masked using the same microlithography (as an example) to create an opaque area 132 on the surface of the disc. Such a configuration may either be positioned on and directly glued to the output screen of an image intensifier using optical glue (as described above), or may be press fit into a plastic or metal outer ring 138 which in turn gets positioned and press fit and glued 136 into or onto the image intensifier tube body.

The masking artwork may be designed in any variety of ways that are conducive to the appearance of the field of view. The mask artwork can be determined manually or may be automated using digital image pattern recognition and a set of selection and sizing criteria specific to the size and type of image intensifier tube. The goal is to cover the blemishes on the image intensifier output screen with the least amount of overage to the mask. Preferred sizes in the letterbox configuration may be selected as 20% top and 20% bottom with the 40% total being the area taken out of the total area of the circular output field of view. With an annular shaped mask the preference is to take no more than about 30% of the area out of mostly the Zone Three (outer) field of view. With a floor mask the preference is to take a 30% mask out of the bottom of the circular output field of view.

Figure 12:
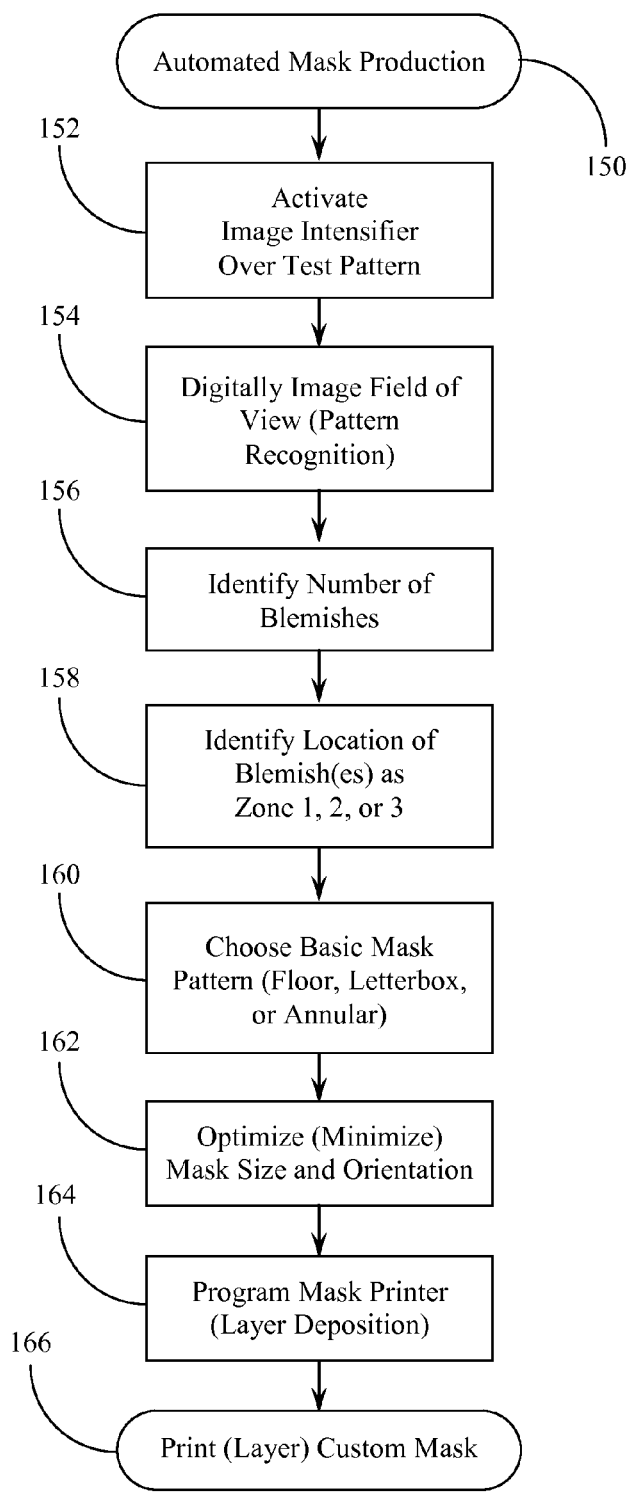
FIG. 12 is a flowchart diagram of a method of manufacturing the image mask device of the present invention.

While the number of manufactured image intensifier tubes that have blemishes that significantly detract from the quality of the view is modest, and of that number a few are beyond remediation with the present invention, there are still enough such manufactured items that some automation of the process of the present invention can occur. With current digital image pattern recognition systems and a relatively fixed set of selection criteria, an automated means for creating an appropriate mask can be utilized. FIG. 12 provides the basic set of method Steps 150 for carrying out such a process. The first Step 152 in the process is to activate the image intensifier tube over a test pattern and at Step 154 to digitally image the field of view. Simple pattern recognition software can identify the number of blemishes (Step 156) and the location of the blemishes (Step 158). From this information, the basic mask pattern (floor, letterbox, or annular) can be selected at Step 160. The selected mask pattern is then sized and oriented (virtually) at Step 162. The device that achieves the deposition of the mask onto the glass disc surface (or the device that cuts the cutout mask) is then programmed with the scaled and selected pattern for the mask at Step 164. Finally the mask is "printed" or layered (or etched) at Step 166 to complete the manufacture of the mask element. The night vision device may then be assembled as described above.

As generally described above, the mask can provide the background for some types of informational displays. In its most economical form, the mask may be used as an area to display simple low battery conditions and/or infrared illuminator on condition warning lights. More complex displays would require additional adjusting optics as anything positioned on the surface of the mask will be slightly out of focus when compared to the in-focus view/image output of the image intensifier tube. Such display focal point adjusting layers are, however, available with many such display systems.

Although the present invention has been described in conjunction with specific embodiments, the examples given are not intended to be limiting of the various geometric configurations that the partially obscuring mask of the present invention might be constructed with. In addition, although a range finder component has been described in association with the digital display device added as a feature to the present invention, various types of other sensor derived information such as visible light intensity levels, radiation levels, and time values may be incorporated into the electronics and displayed on the digital display described. Those skilled in the art will recognize a variety of different geometries to the various partially obscuring mask discs, as well as a variety of components suitable for placing, positioning, and securing the partially obscuring mask discs in front of the field of view associated with the image intensifier tube. Those skilled in the art will recognize that a variety of different input and output optics are typically associated with night vision equipment and that modifications as to the placement of the partially obscuring mask disc may be necessary to accommodate these various optical elements. Such modifications do not depart from the spirit and scope of the defined invention.

I claim:

1. A mask element for use in conjunction with an imperfectly manufactured image intensifier tube, the mask element serving to modify the field of view through the image intensifier tube to make a night vision device utilizing the imperfectly manufactured image intensifier tube more marketable, the mask element comprising:
    a mask disc comprising a solid flat disc having a diameter approximately equal to a diameter of an output screen of the image intensifier tube, the mask disc defining a cut-out through which an unblemished portion of the output screen of the image intensifier tube may be viewed;
    wherein the mask disc may be positioned on, oriented, and secured over the output screen of the image intensifier tube in conjunction with an assembly of the night vision device.

2. The mask element of claim 1 wherein the solid portion of the mask disc is a circular segment.

3. The mask element of claim 1 wherein the solid portion of the mask disc is two opposing circular segments.

4. The mask element of claim 1 wherein the solid portion of the mask disc is an offset annulus.

5. The mask element of claim 1, wherein the mask disc is secured over the output screen with optical adhesive.

6. The mask element of claim 1, wherein the mask disc is secured over the output screen with a secondary retaining ring.

7. The mask element of claim 1 further comprising electronic display components positioned over the solid portion of the mask disc.

8. A mask element for use in conjunction with an imperfectly manufactured image intensifier tube, the mask element serving to modify the field of view through the image intensifier tube to make a night vision device utilizing the imperfectly manufactured image intensifier tube more marketable, the mask element comprising:
    an optical disc comprising a solid transparent disc having a diameter approximately equal to a diameter of an output screen of the image intensifier tube, the optical disc comprising a transparent area and an opaque area, the opaque area comprising a deposited layer of opaque material and the transparent area defining an optical path through which an unblemished portion of the output screen of the image intensifier tube may be viewed;
    wherein the optical disc may be positioned on, oriented, and secured over the output screen of the image intensifier tube in conjunction with an assembly of the night vision device.

9. The mask element of claim 8 wherein the opaque area of the optical disc is a circular segment.

10. The mask element of claim 8, wherein the opaque area of the optical disc is two opposing circular segments.

11. The mask element of claim 8, wherein the opaque area of the optical disc is an offset annulus.

12. The mask element of claim 8, wherein the optical disc is secured over the output screen with an optical adhesive.

13. The mask element of claim 8, wherein the optical disc is secured over the output screen with a secondary retaining ring.

14. The mask element of claim 8 further comprising electronic display components positioned over the opaque portion of the optical disc.

15. A method for manufacturing a mask element for use in conjunction with an imperfectly manufactured image intensifier tube, the mask element serving to modify the field of view through the image intensifier tube to make a night vision device utilizing the imperfectly manufactured image intensifier tube more marketable, the method of manufacture comprising the steps of:
    (a) activating the imperfectly manufactured image intensifier tube over a test pattern;
    (b) digitally imaging the field of view in the image intensifier tube;
    (c) identifying one or more blemishes in the imaged field of view;
    (d) identifying the location of the blemishes in the imaged field of view;
    (e) selecting a basic mask pattern to be used from the group of floor mask, letterbox mask, or annular mask;
    (f) sizing and orienting the selected mask pattern;
    (g) selecting an optical disc for preparation as a mask element based upon the size of the image intensifier tube and the sized mask pattern;
    (h) providing a programmable system for depositing an opaque layer on the selected optical disc;
    (i) programming the system for depositing an opaque layer with the size and orientation of the selected mask pattern; and
    (j) operating the system for depositing the opaque layer onto the optical disc.

* * * * *